United States Patent [19]

Kuwabara et al.

[11] Patent Number: 4,639,141

[45] Date of Patent: Jan. 27, 1987

[54] SCANNING RAY BEAM GENERATOR FOR OPTICAL MEASURING DEVICE

[75] Inventors: Yoshiharu Kuwabara; Hiroyoshi Hamada, both of Kanagawa, Japan

[73] Assignee: Mitutoyo Mfg. Co., Ltd., Tokyo, Japan

[21] Appl. No.: 550,292

[22] Filed: Nov. 9, 1983

[30] Foreign Application Priority Data

Nov. 12, 1982 [JP] Japan .................. 57-198508
Nov. 16, 1982 [JP] Japan .................. 57-200977

[51] Int. Cl.⁴ .............................. G01B 11/08
[52] U.S. Cl. ........................ 356/387; 350/6.8
[58] Field of Search ............... 350/6.5, 6.6, 6.7, 6.8; 356/380, 384, 385, 386, 387; 250/560

[56] References Cited

U.S. PATENT DOCUMENTS 3,853,406 12/1974 Zanoni .................. 356/387
4,427,296 1/1984 Demarest et al. .................. 356/387

Primary Examiner—F. L. Evans
Attorney, Agent, or Firm—Koda and Androlia

[57] ABSTRACT

In an optical measuring device including: a parallel scanning ray beam generator having a rotary mirror for reflecting incident ray beams from a beam generator and converting the same into rotary scanning ray beams and a collimator lens for converting the rotary scanning ray beams into parallel scanning ray beams; and a light receiving element for detecting bright and dark portions of the parallel scanning ray beams which have passed through the workpiece to be measured; whereby a dimension in the scanning direction of the workpiece to be measured is sought from a length of time of a dark portion or a bright portion generated due to the obstruction of part of the parallel scanning ray beams by the workpiece to be measured which is interposed between the parallel scanning ray beam generator and the light receiving element, the incident optical axis of ray beams directly or indirectly emitted from the beam generator to the rotary mirror and an optical axis of the collimator lens for converting the rotary scanning ray beams formed by the aforesaid ray beams and reflected by the rotary mirror into the parallel scanning ray beams cross from directions opposite to each other and at equal angles with respect to a rotary plane perpendicular to a rotary center axis of the rotary mirror.

12 Claims, 10 Drawing Figures

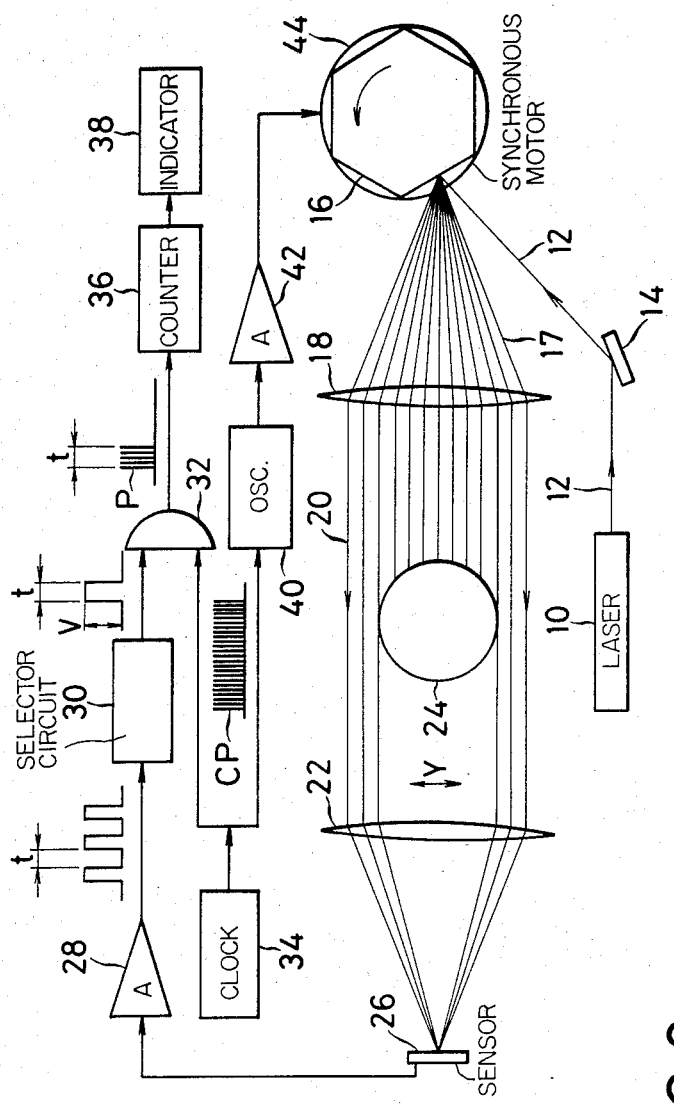
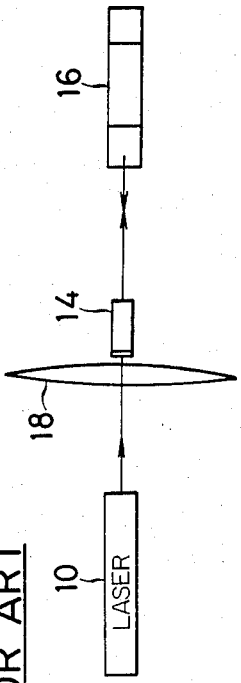
FIG.1 PRIOR ART
FIG.2 PRIOR ART

4,639,141

SCANNING RAY BEAM GENERATOR FOR OPTICAL MEASURING DEVICE

BACKGROUND OF THE INVENTION

1. Field of the Invention

This invention relates to optical measuring devices, and more particularly to improvements in an optical measuring device, wherein parallel scanning ray beams are utilized to measure dimensions and the like of a workpiece to be measured.

2. Description of the Prior Art

Heretofore, there has been adopted an optical measuring device wherein rotary scanning ray beams (laser beams) are converted by a collimator lens into parallel scanning ray beams being passed through this collimator lens and a condensing lens, a workpiece to be measured is interposed between the collimator lens and the condensing lens, and the dimensions of the workpiece to be measured are measured from a time length of a dark portion or a bright portion generated due to the obstruction of the parallel scanning ray beams by the workpiece to be measured.

More specifically, as shown in FIGS. 1 and 2, laser beam 12 are oscillated from a laser tube 10 toward a stationary mirror 14, the laser beams 12 reflected by the stationary mirror 14 are converted into rotary scanning ray beams 17 by a polygonal rotary mirror 16, the scanning ray beams 17 are converted into parallel scanning ray beams 20 by a collimator lens 18, a workpiece 24 to be measured interposed between the collimator lens 18 and a condensing lens 22 is scanned at high speed by the parallel scanning ray beams 20, and the dimension of the workpiece 24 to be measured in the scanning direction (direction Y) is measured from the time length of the dark portion or the bright portion generated due to the obstruction of the parallel scanning ray beams by the workpiece 24 to be measured. More specifically, the bright and dark portions of the parallel scannning ray beams 20 are detected as variations in input voltage of a light receiving element 26 disposed at the focal point of the condensing lens 22. Signals from the light receiving element 26 are fed to a pre-amplifier 28, where they are amplified, and then, fed to a segment selector circuit 30. This segment selector circuit 30 is adapted to generate a voltage V from the voltage outputted from the light receiving element 26 to open a gate circuit 32 only for a time t, during which the workpiece 24 to be measured is scanned, and feeds the same to the gate circuit 32. A continuous clock pulses CP are fed to this gate circuit 32 from a clock pulse oscillator 34, whereby the gate circuit 32 generates clock pulses P for counting the time t corresponding to a dimension in the scanning direction (i.e., an outer diameter) of the workpiece 24 to be measured and feeds the same to a counter circuit 36. Upon counting the clock pulses P, the counter circuit 36 feeds a count signal to a digital indicator 38, where the dimension in the scanning direction of the workpiece 24 to be measured is digitally indicated. On the other hand, the rotary mirror 16 is rotated by a synchronous motor 44 driven in synchronism with an output from a synchronous sinusoidal wave oscillator 40 for generating a sinusoidal wave in synchronism with an output from the clock pulse oscillator 34 and a power amplifier 42 in response to clock pulses CP emitted from the clock pulse oscillator 34, whereby the measuring accuracy is maintained.

The above-described fast-scan type laser length measuring device has been widely utilized because the lengths, thicknesses and the like of moving woekpiece and workpieces heated to a high temperature can be measured at high accuracies in non-contact relationship therewith.

However, in the case of the above-described fast-scan type laser length measuring device, since a reflecting point 16A of the rotary mirror 16 is periodically varied in its distance in the scanning direction to an optical axis 18A of the collimator lens 18 as enlargedly shown in FIG. 3, such a disadvantage is presented that the measuring accuracy fluctuates.

Furthermore, in the above-described fast-scan type laser length measuring device, if a bedplate, to which are secured the stationary mirror 14, the rotary mirror 16 and the collimator lens 18, is expanded or shrunk due to a change in the ambient temperature, then a distance from the rotary mirror 16 to the collimator lens 18 is varied accordingly, whereby the reflecting point 16A of the rotary mirror 16 is varied in the scanning direction with respect to the optical axis 18A of the collimator lens 18, thus presenting the disadvantage of lowering the measuring accuracy.

Additionally, when the above-described length measuring device is assembled or adjusted, the adjustment of positional relationship between the stationary mirror 14, the rotary mirror 16 and the collimator lens 18 has been very difficult, thus affecting the measuring accuracy to a considerable extent.

To obviate the disadvantages that the bedplate is expanded or shrunk due to the temperature change, there is a proposal that the bedplate, on which are rested the stationary mirror 14, the rotary mirror 16 and the collimator lens 18, is made of an alloy or the like being low in the coefficient of thermal expansion, however, in this case, such alloy materials are high in cost, thereby presenting the disadvantage of increasing the cost to a considerable extent.

SUMMARY OF THE INVENTION

One object of the present invention is to provide an optical measuring device, wherein an adverse influence of a measuring error due to a relative displacement of a reflecting point of a rotary mirror is minimized.

Further, another object of the present invention is to provide an optical measuring device, wherein the adjustment in position of the rotry mirror with respect to the optical axes of a collimator lens and the incident optical axis of a collimator lens and the incident optical axis from a laser tube can be facilitated.

Furthermore, a further object of the present invention is to provide an optical measuring device, wherein a shift of the rotary mirror due to a thermal expansion or shrinkage with respect to the optical axis of the collimator lens and the incident optical axis from the laser tube can be minimized and the adjustment for waking up for the shift can be facilitated.

To the above end, the present invention contemplates that, in an optical measuring device including: a parallel scanning ray beam generator having a rotary mirror for reflecting incident ray beams from a beam generator and converting the same into rotary scanning ray beams and a collimator lens for converting the rotary scanning ray beams into parallel scanning ray beams; and a light receiving element for detecting bright and dark portions of the parallel scanning ray beams which have passed through the workpiece to be measured; whereby a dimension in the scanning direction of the workpiece to be measured is sought from a length of time of a dark portion or a bright portion generated due to the obstruction of part of the parallel scanning ray beams by the workpeice to be measured which is interposed between the parallel scanning ray beam generator and the light receiving element, an incident optical axis of ray beams directly or indirectly emitted from the beam generator to the rotary mirror and an optical axis of the collimator lens for converting the rotary scanning ray beams formed by the aforesaid ray beams and reflected by the rotary mirror into the parallel scanning ray beams cross from directions opposite to each other and at equal angles with respect to a rotary plane perpendicular to a rotary center axis of the rotary mirror, whereby a influence of a relative displacement of a reflecting point by the rotary mirror is represented by fluctuations of the rotary scanning ray beams and the parallel scanning ray beams in directions perpendicular to their scanning directions, so that the measuring error can be minimized.

To the above end, the present invention contemplates that, in the above-described optical measuring device, the incident optical axis and the optical axis of collimator lens are made perpendicular to the rotary plane and disposed in one and the same plane incorporating the rotary center axis, so that the measuring error due to fluctuations of the rotary mirror is further minimized.

To the above end, the present invention contemplates that, in an optical measuring device including: a parallel scanning ray beam generator having a rotary mirror for reflecting incident ray beams from a beam generator and converting the same into rotary scanning ray beams and a collimator lens for converting the rotary scanning ray beams into parallel scanning ray beams; and a light receiving element for detecting the bright and dark portions of the parallel scanning ray beams which have passed through the workpiece to be measured; whereby a dimension in the scanning direction of a workpiece to be measured is sought from a length of time of a dark portion or a bright portion generated due to the obstruction of part of the parallel scanning ray beams by the workpiece to be measured, which is interposed between the parallel scanning ray beam generator and the light receiving element, the beam generator or a mirror for reflecting the ray beams from the beam generator and projecting the same to the rotary mirror, and the collimator lens are mounted onto one and the same bedplate and a base of the rotary mirror is made rotatable with respect to the bedplate about a pin stem and a pin hole disposed on an axial line passsing through an intersection between the optical axis of the collimator lens and a reflecting surface of the rotary mirror and perpendicularly intersecting a plane incorporating the incident optical axis of the ray beams into the rotary mirror and the optical axis of the collimator lens, whereby the adjustment in position of the rotary mirror with respect to the collimator lens and the incident optical axis of the ray beams can be facilitated.

To the above end, the present invention contemplates that, in the above-described optical measuring device, the incident optical axis of the ray beams, the optical axis of the collimator lens and the rotary center axis of the rotary mirror are incorporated in one and the same plane.

To the above end, the present invention contemplates that, in the above-described optical measuring device, the base of the rotary mirror is made rotatable with respect to the bedplate about the pin stem and the pin hole formed in a second bedplate secured to the aforesaid bedplate in a manner to be displaceable relative to the aforesaid bedplate in parallel to the optical axis of the collimator lens due to the thermal expansion or shrinkage.

To the above end, the present invention contemplates that, in the above-described optical measuring device, the second bedplate is made of a material low in the coefficient of thermal expansion such for example as invar.

BRIEF DESCRIPTION OF THE DRAWINGS

FIG. 1 is a block diagram showing the conventional optical measuring device;

FIG. 2 is a front view thereof;

DETAILED DESCRIPTION OF THE PREFERRED EMBODIMENT

Figure 3:
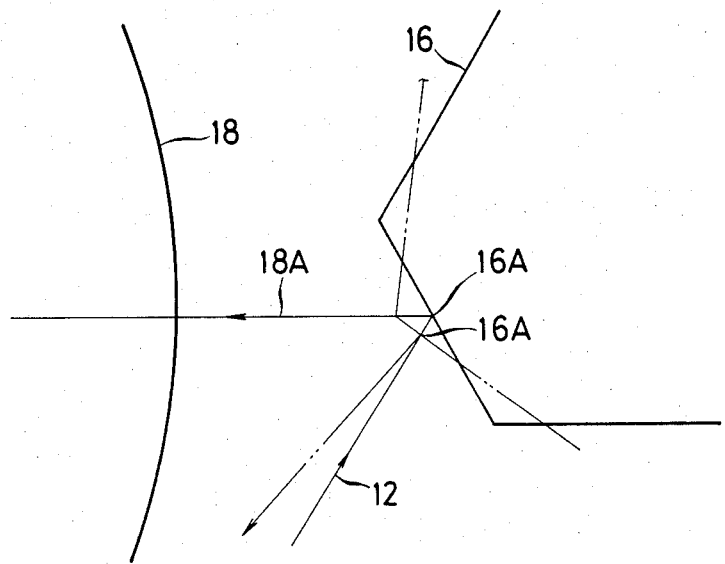
FIG. 3 is an enlarged plan view showing the relationship between the rotary mirror, the incident optical axis thereof and the collimator lens in the conventional optical measuring device.

Description will hereunder be given of one embodiment of the present invention with reference to the drawings. Here, in this embodiment, same reference numerals as shown in FIG. 1 are used to designate same or similar parts identical with or corresponding to those in the conventional optical measuring device, so that detailed description will be omitted.

Figure 4:
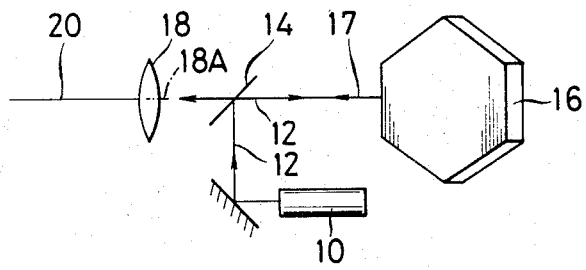
FIG. 4 is an enlarged plan view showing an embodiment of the optical measuring device according to the present invention.
Figure 5:
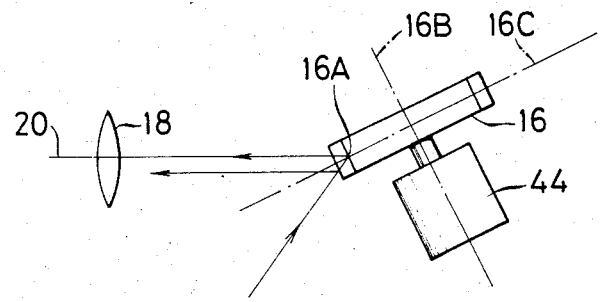
FIG. 5 is a front view thereof.

As shown in FIGS. 4 and 5, according to this embodiment, in the optical measuring device similar to that shown in FIG. 1, the incident optical axis of the ray beams 12 directly or indirectly emitted from the laser tube 10 as being the beam generator to the rotary mirror 16 and the optical axis 18A of the collimator lens 18 for converting the reflected rotary scanning ray beams 17 formed by the aforesaid ray beams 12 and reflected by the rotary mirror 16 into the parallel scanning ray beams 20 cross from directions opposite to each other and at equal angles with respect to the rotary plane 16C perpendicular to the rotary center axis 16B of the rotary mirror 16.

More specifically, as shown in FIG. 2, the optical axis of the collimator lens 18 and the incident optical axis from the stationary mirror 14, both of which have heretofore been disposed in the rotary plane of the rotary mirror 16, are disposed in directions different from each other (from upward and downward in FIG. 5) with respect to the rotary plane 16C.

In this embodiment, the stationary mirror 14 for reflecting the laser beams 12 emitted from the laser tube 10 is disposed downwardly of the rotary plane 16C in the drawing and the collimator lens 18 is disposed upwardly of the rotary plane 16C, respectively. Furthermore, the aforesaid incident optical axis and the optical axis of the collimator lens 18 perpendicularly intersect the aforesaid rotary plane and disposed in one and the same plane incorporating the rotary center axis 16B.

In consequence, in this embodiment, rotation of the hexagonal rotary mirror 16 periodically fluctuates the distance from the stationary mirror 14 and the collimator lens 18 to the reflecting point 16A. However, as shown in FIG. 5, the influence of the fluctuations mainly appears in a direction perpendicular to the scanning directions of the rotary scanning ray beams 17 and the parallel scanning ray beams 20 (the vertical direction in the drawing), so that the measuring error is reduced to a considerable extent).

In this case, even if the parallel scanning ray beams 20 fluctuate in the vertical direction, the workpiece 24 to be measured can avoid the adverse influence of the fluctuations in the vertical direction because the workpiece is scanned in a direction perpendicular to the fluctuations for measurement.

In addition, in the above embodiment, the incident optical axis of the laser beams 12 into the rotary mirror 16 and the optical axis 18A of the collimator lens 18 perpendicularly intersect the rotary plane 16C and disposed in the plane incorporating the rotary center axis 16B, however, the present invention need not necessarily be limited to this, and there are included the cases where the plane incorporating the incident optical axis and the optical axis of the collimator lens 18 cross the rotary plane 16° C. at an angle smaller than 90° (except 0°).

However, when the incident optical axis and the optical axis 18A are disposed in the plane perpendicularly intersecting the rotary plane 16C, the influence of the error due to the relative displacement of the reflecting point 16A of the rotary mirror 16 appears in the direction perpendicular to the scanning directions at the maximum, whereby the measuring error in this case is least.

Description will now be given of the second embodiment of the present invention as shown in FIGS. 6 through 10.

According to this embodiment, in the optical measuring device similar to that shown in FIG. 1, the laser tube 10 as being the beam generator, the stationary mirrors 14A and 14B reflecting the ray beams from the laser tube 10 and projecting the same to the rotary mirror 16 and the collimator lens 18 are mounted onto one and a same bedplate 46, and a base 48 of the rotary mirror 16 is made rotatable with respect to the bedplate 46 about a pin stem 54 and a pin hole 56 disposed on an axial line 52 passing through the intersection between the optical axis 18A of the collimator lens 18 and the reflecting surface of the rotary mirror 16 (the reflecting point 16A) and perpendicularly intersecting the plane incorporating the incident optical axis of the ray beams 12 to the rotary mirror 16 and the optical axis 18A of the collimator lens 18.

The incident optical axis of the ray beams 12, the optical axis 18A of the collimator lens 18 and the rotary center axis 16A of the rotary mirror 16 are disposed on one and the same plane.

Figure 8:
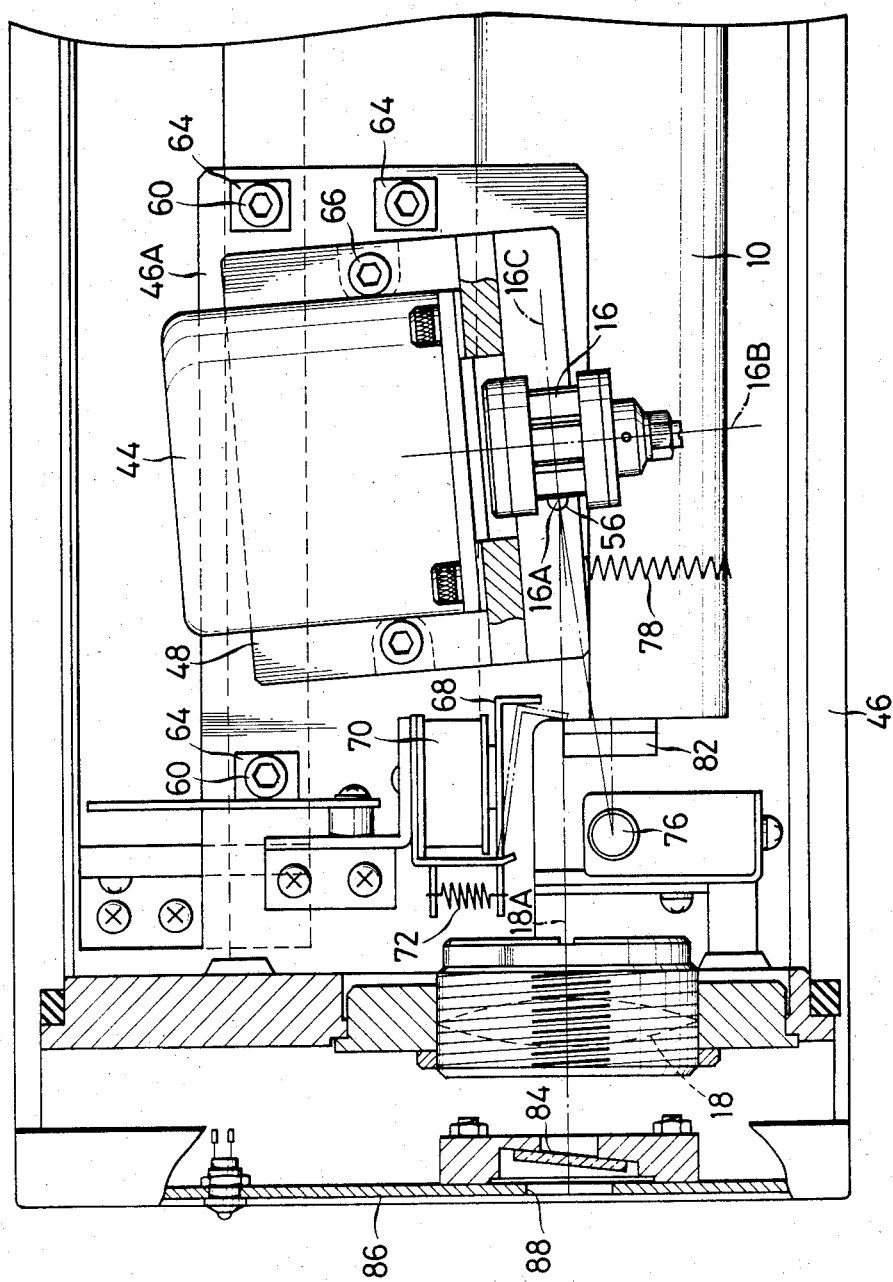
FIG. 8 is a sectional view taken along the line VIII—VIII in FIG. 6.
Figure 9:
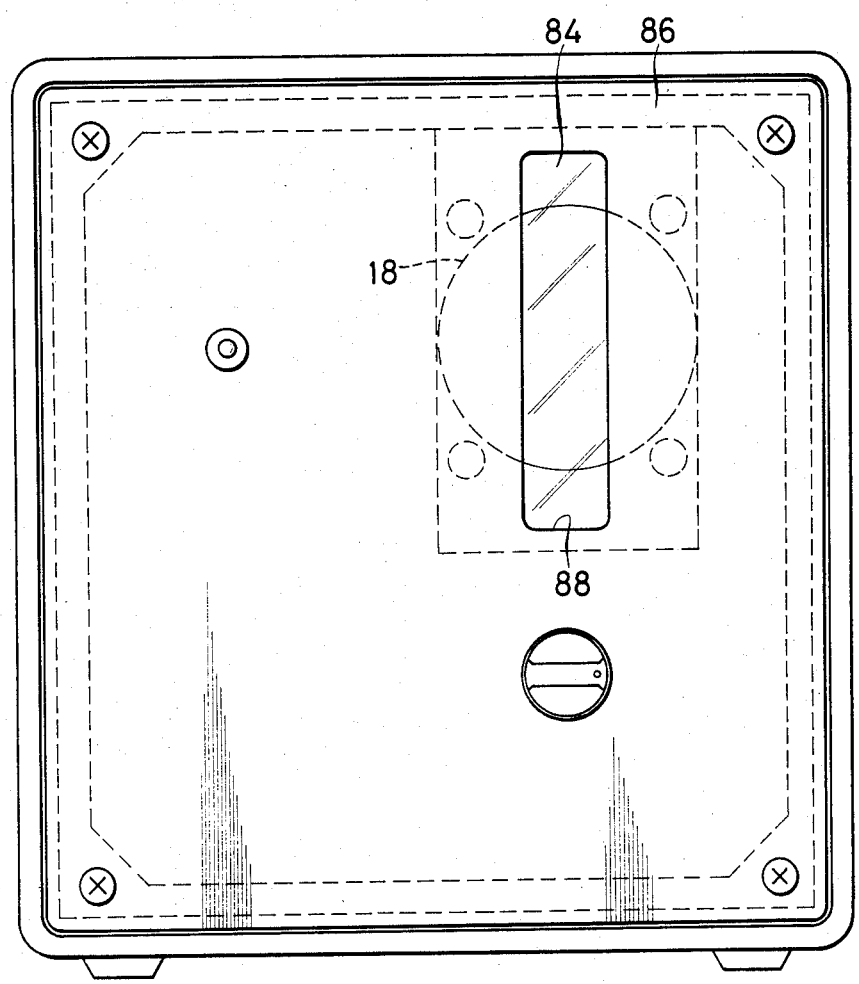
FIG. 9 is a sectional view taken along the line IX—IX in FIG. 6.

Similarly to the first embodiment, the incident optical axis of the ray beams 12 into the rotary mirror 16 and the aforesaid optical axis 18A cross the rotary plane 16C perpendicularly intersecting the rotary center axis 16B of the rotary mirror 16 in the directions opposite to each other and at equal angles (Refer to FIG. 8).

Futheremore, a bese 46A of the rotary mirror 16 is made rotatable about the pin stem 54 and the pin hole 56 on a second bedplate 48A secured to the bedplate 46 in a manner to be displaceable relative to the bedplate 46 in parallel to the optical axis 18A of the collimator lens 18.

The second bedplate 46A is made of a material low in the coefficient of thermal expansion such for example as invar, has an area sufficient for having rested thereon the base 48 of the rotary mirror 16 and formed into a thin plate to a thickness necessary and sufficient.

Figure 6:
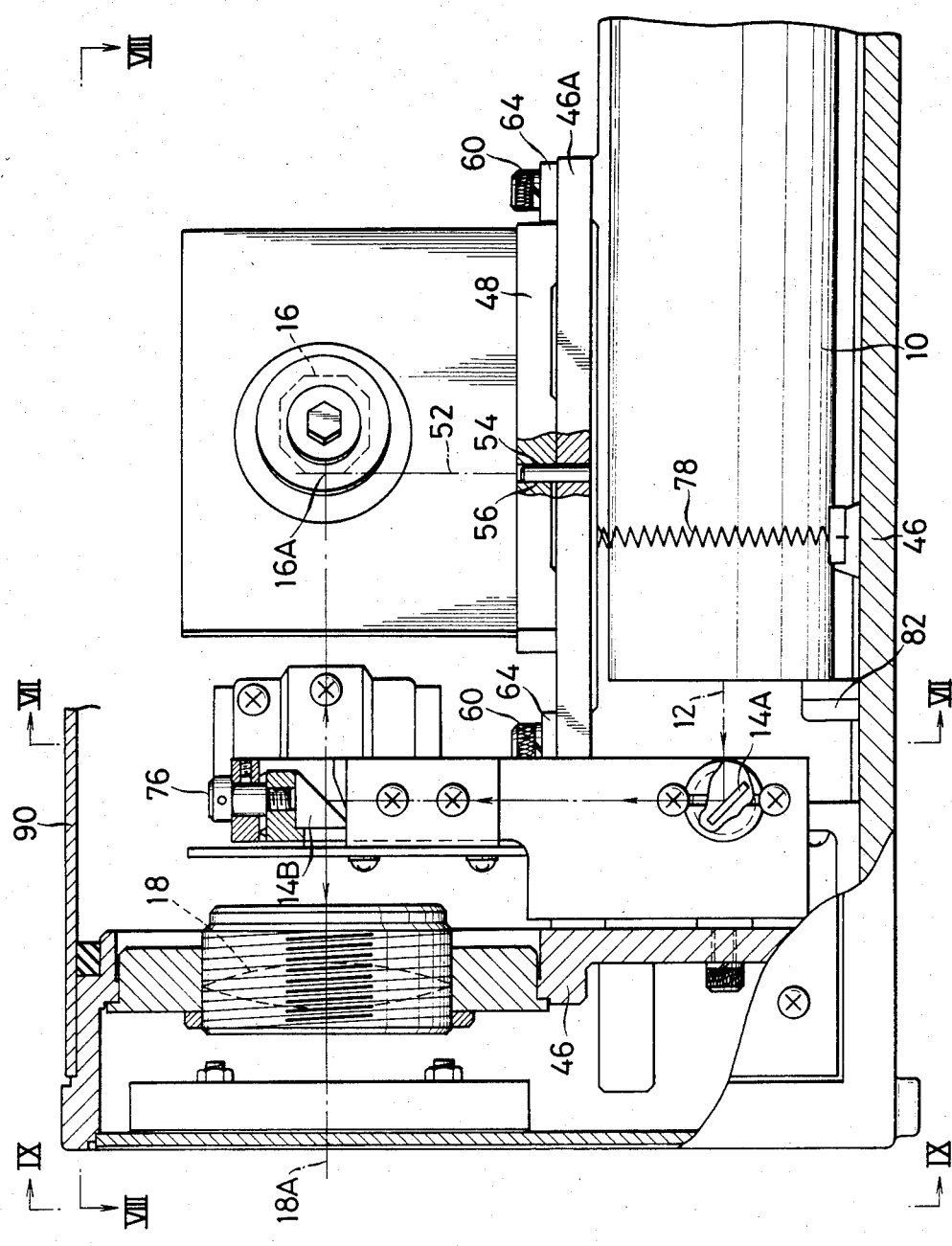
FIG. 6 is a second embodiment of the optical measuring device according to the present invention.
Figure 7:
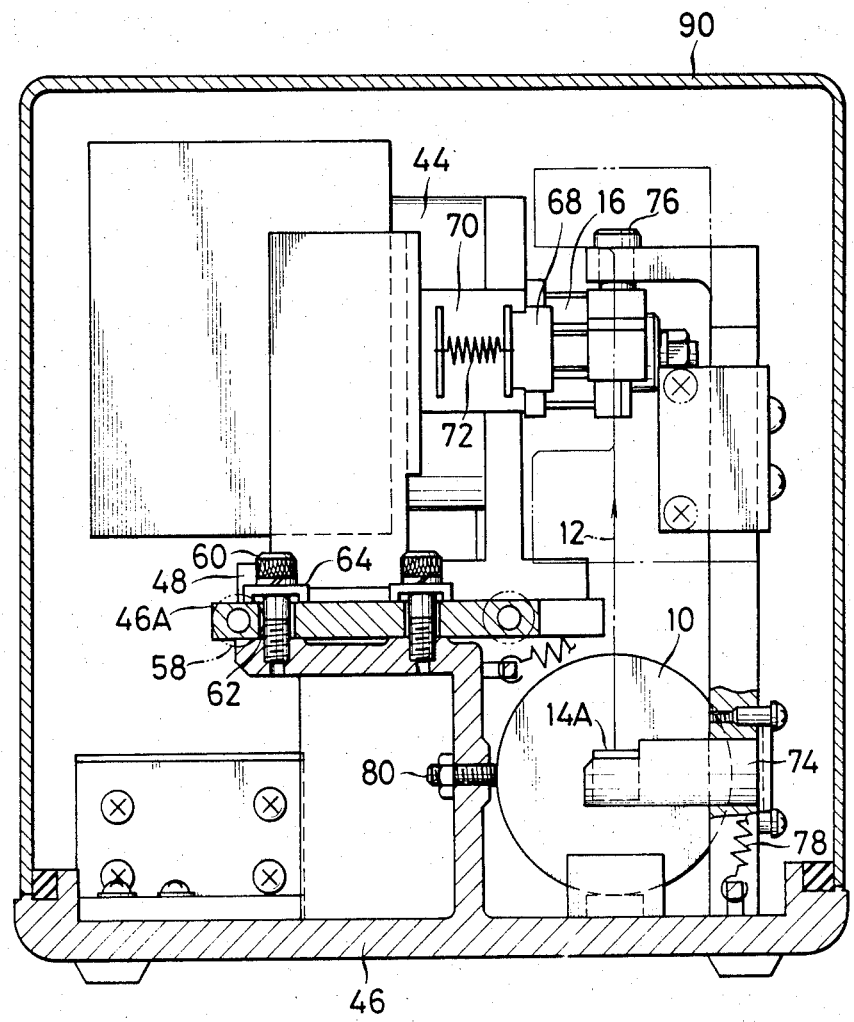
FIG. 7 is a sectional view taken along the line VII—VII in FIG. 6.

More specifically, as shown in FIG. 7, the second bedplate 46A is integrally secured in the longitudinal direction thereof through two bolts 58 to a horizontal portion of an inverted L-shaped member erected from the bedplate 46, and further, as shown in FIG. 6, is secured to the top surface of the erected member of the bedplate 46 in the horizontal state through four bolts 60 each having hexagonal hole.

As shown in FIG. 3, bolt holes 62 formed in the second bedplate 46A for receiving the bolts 60 with the hexagonal hole are made larger than the outer shape of the bolts 60 with the hexagonal hole and slide washers 64 are interposed between the head portions of the bolts 60 with the hexagonal hole and the top surface of the second bedplate 46A, so that the thermal expansion or shrinkage of the bedplate 46A to the bedplate 46 can be accommondated within a given range.

As shown in FIG. 6, the pin hole 56 formed in the base 48 is coupled onto the pin stem 5 planted in the second bedplate 46A, whereby the base 48 is mounted for rotation about the axial line 52, and, as shown in FIG. 8, is fixed through two bolts 66 each having a hexagonal hole.

In the drawing, designated at 68 is a shutter for shielding the rotary scanning ray beams 17 formed through the reflection by the rotary mirror 16, 70 a solenoid for driving the shutter, and 72 a return spring for the shutter 68.

Furthermore, in the drawing, denoted at 74 is a cylindrical holder secured to the bedplate 46 in a manner to be adjustable in rotating mirror 14A relative to the ray beams 12, and 76 an adjust screw for adjusting in the vertical direction the stationary mirror 14B for reflecting the ray beams 12, which have been reflected by the stationary mirror 14A, toward the rotary mirror 16.

Further, in the drawing, designated at 78 is a spring for resiliently securing the laser tube 10 to the bedplate 46, 80 an adjust screw for adjusting the laser tube 10 in its position in the lateral direction, and 82 a stopper for regulating the laser tube 10 in its position in the longitudinal direction.

Furthermore, in the drawing, denoted at 84 is a cover glass. This cover glass 84 is disposed in a manner to shield the collimator's side of a scanning hole 88 at the rear surface of the scanning hole 88 formed in a protective cover 86 in a manner to be elongated along the scanning direction of the parallel scanning ray beams 20 formed by the collimator lens 18. Furthermore, in the drawing, designated at 90 is a cover for covering the bedplate 46.

According to this embodiment, in the adjustment during assembling, the base 48 of the rotary mirror 16 is made rotatable with respect to the second bedplate 46A and the bedplate 46 about the pin stem 54 and the pin hole 56 disposed on the axial line 52 perpendicularly intersecting the plane incorporating the incident optical axis of the ray beams 12 into the rotary mirror 16 and the optical axis 18A of the collimator lens 18, whereby the rotary mirror 16 and the base 48 are rotatably adjusted about the pin stem 54, so that the positional relationship between the collimator lens 18 and the stationary mirror 14B can be readily adjusted.

Furthermore, in this embodiment, the second bedplate 46A, on which the base 48 of the rotary mirror 16 is rested, is secured to the bedplate 46 in a manner to be thermally expandable or shrinkable in parallel to the optical axis 18A of the collimator lens 18 and made of a material low in the coefficient of thermal expansion, whereby, even if a thermal expansion or shrinkage occurs, the value thereof is small and the second bedplate 46A thermally expands or shrinks only in the direciton of the optical axis 18A of the collimator lens 18, so that a shift of the rotary mirror 16 with respect to the collimator lens 18 and the stationary mirror 14B can be readily adjusted.

Figure 10:
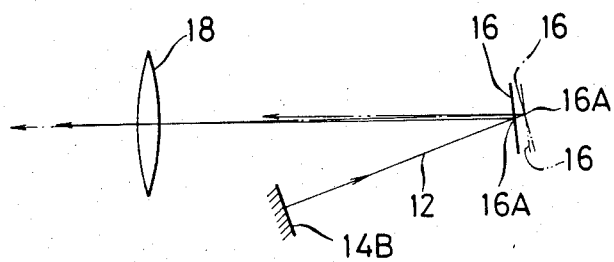
FIG. 10 is a plan view schematically showing the conditions of the rotary mirror at the time of adjustment in the second embodiment.

Additionally, as shown in FIG. 10, the base 48 is rotatably adjusted in its position about the pin stem 54, so that this shift can be readily adjusted.

Further, in replacing the rotary mirror 16, the motor 44 for driving the rotary mirror 16 or the like, such an advantage can be offered that only the adjustment of the base 48 in its position about the positional relationship of the rotary mirror 16 with the collimator lens 18 and the stationary mirror 14B.

Furthermore, in this embodiment, the second bedplate 46A is formed into the thin plate member having the area and thickness necessary and sufficient for having rested thereon the base 48 of the rotary mirror 16, so that the cost for the material can be reduced.

In consequence, in this embodiment, similarly to the first embodiment, rotation of the hexagonal rotary mirror 16 periodically fluctuates the distance from the stationary mirror 14 and the collimator lens 18 to the reflecting point 16A. However, as shown in FIG. 5, the influence of the fluctuations mainly appears in a direction perpendicular to the scanning directions of the rotary scanning ray beams 17 and the parallel scanning ray beams 20 (the vertical direction in the drawing), so that the measuring error is reduced to a considerable extent).

Additionally, in the above embodiment, the pin hole 56 is formed in the base 48 and the pin stem 54 is provided on the second bedplate 46A, however, this arrangement may be converted.

Further, in the above embodiment, the optical axis 18A of the collimator lens 18, the incident optical axis of the ray beams 12 into the rotary mirror 16 and the rotary center axis 16B of the rotary mirror 16 are disposed in one and the same plane, however, the present invention need not necessarily be limited to this, but, the plane incorporating the optical axis 18A and the incident optical axis may cross the rotary center axis 16B.

However, when the aforesaid three axes are disposed in the same plane, the positional adjustment between the three axes can be facilitated.

What is claimed is;
1. An optical measuring device comprising:
a parallel scanning ray beam generator including a polygonal rotary mirror for reflecting incident ray beams from a beam generator and converting the same into rotary scanning ray beams and a collimator lens for converting the rotary scanning ray beam into parallel scanning ray beams; and
a light receiving element for detecting a presence or absence of the parallel scanning ray beams which have been directed at a workpiece to be measured;
whereby a dimension in the scanning direction of the workpiece to be measured is sought from a length of time of an absence of said parallel scanning ray beams is detected due to the obstruction of part of the parallel scanning ray beams by the workpiece to be measured which is interposed between the parallel scanning ray beam generator and the light receiving element.
characterized in that at least a mirror out of the beam generator and a mirror for reflecting the ray beams from the beam generator and projecting the same to the rotary mirror and the collimator lens are mounted onto one bedplate, and a base of the rotary mirror is made rotatable with respect to the one bedplate about a pin stem and a pin hole disposed on an axial line passing through an intersection between the optical axis of the collimator lens and a reflecting surface of the rotary mirror and perpendicularly intersecting a plane incorporating the incident optical axis of the ray beams into the rotary mirror and the optical axis of the collimator lens.

2. An optical measuring device as set forth in claim 1, wherein said incident optical axis of the ray beams, said optical axis of the collimator lens and the rotary center axis of the rotary mirror are disposed in one and the same plane.

3. An optical measuring device as set forth in claim 1, wherein said base of the rotary mirror is made rotatable with respect to said one bedplate about said pin stem and said pin hole formed in a second one bedplate secured to said bedplate in a manner to be displaceable relative to said one bedplate in parallel to the optical axis of said collimator lens due to the thermal expansion or shrinkage.

4. An optical measuring device as set forth in claim 2, wherein said base of the rotary mirror is made rotatable with respect to said one bedplate about said pin stem and said pin hole formed in a second one bedplate secured to said bedplate in a manner to be displaceable relative to said one bedplate in parallel to the optical axis of said collimator lens due to the thermal expansion or shrinkage.

5. An optical measuring device as set forth in claim 3, wherein said second bedplate is made of a material low in the coefficient of thermal expansion.

6. An optical measuring device as set forth in claim 4 wherein said second bedplate is made of a material low in the coefficient of thermal expansion.

7. An optical measuring device as set forth in claim 1, wherein the incident optical axis of ray beams directly or indirectly emitted from the beam generator to the rotary mirror and the optical axis of the collimator lens for converting reflected rotary scanning ray beams formed by the aforesaid ray beams and reflected by the rotary mirror into the parallel scannning ray beams cross from directions opposite to each other and at equal angles with respect to a rotary plane perpendicular to a rotary center axis of the rotary mirror.

8. An optical measuring device as set forth in claim 2, wherein the incident optical axis of ray beams directly or indirectly emitted from the beam generator to the rotary mirror and the optical axis of the collimator lens for converting reflected rotary scanning ray beams formed by the aforesaid ray beams and reflected by the rotary mirror into the parallel scannning ray beams cross from directions opposite to each other and at equal angles with respect to a rotary plane perpendicular to a rotary center axis of the rotary mirror.

9. An optical measuring device as set forth in claim 3, wherein the incident optical axis of ray beams directly or indirectly emitted from the beam generator to the rotary mirror and the optical axis of the collimator lens for converting reflected rotary scanning ray beams formed by the aforesaid ray beams and reflected by the rotary mirror into the parallel scannning ray beams cross from directions opposite to each other and at equal angles with respect to a rotary plane perpendicular to a rotary center axis of the rotary mirror.

10. An optical measuring device as set forth in claim 4, wherein the incident optical axis of ray beams directly or indirectly emitted from the beam generator to the rotary mirror and the optical axis of the collimator lens for converting reflected rotary scanning ray beams formed by the aforesaid ray beams and reflected by the rotary mirror into the parallel scannning ray beams cross from directions opposite to each other and at equal angles with respect to a rotary plane perpendicular to a rotary center axis of the rotary mirror.

11. An optical measuring device as set forth in claim 5, wherein the incident optical axis of ray beams directly or indirectly emitted from the beam generator to the rotary mirror and the optical axis of the collimator lens for converting reflected rotary scanning ray beams formed by the aforesaid ray beams and reflected by the rotary mirror into the parallel scannning ray beams cross from directions opposite to each other and at equal angles with respect to a rotary plane perpendicular to a rotary center axis of the rotary mirror.

12. An optical measuring device as set forth in claim 6, wherein the incident optical axis of ray beams directly or indirectly emitted from the beam generator to the rotary mirror and the optical axis of the collimator lens for converting reflected rotary scanning ray beams formed by the aforesaid ray beams and reflected by the rotary mirror into the parallel scannning ray beams cross from directions opposite to each other and at equal angles with respect to a rotary plane perpendicular to a rotary center axis of the rotary mirror.

* * * * *